(12) United States Patent
Dietz et al.

(10) Patent No.: US 10,913,233 B2
(45) Date of Patent: Feb. 9, 2021

(54) STRUCTURE WITH HONEYCOMB CORE

(71) Applicant: MAGNA STEYR Fahrzeugtechnik AG & Co KG, Graz (AT)

(72) Inventors: Wolfgang Dietz, Pirching (AT); Danijel Drezga, Ried im Innkreis (AT); Guenter Wolfsberger, Lieboch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 15/317,513

(22) PCT Filed: Dec. 21, 2015

(86) PCT No.: PCT/EP2015/080784
§ 371 (c)(1),
(2) Date: Dec. 9, 2016

(87) PCT Pub. No.: WO2016/102459
PCT Pub. Date: Jun. 30, 2016

(65) Prior Publication Data
US 2017/0282484 A1    Oct. 5, 2017

(30) Foreign Application Priority Data
Dec. 22, 2014  (EP) .................... 14199858

(51) Int. Cl.
*B32B 3/12*   (2006.01)
*B32B 5/02*   (2006.01)
(Continued)

(52) U.S. Cl.
CPC .............. *B32B 3/12* (2013.01); *B29D 24/005* (2013.01); *B29D 99/0089* (2013.01); *B32B 3/26* (2013.01);
(Continued)

(58) Field of Classification Search
CPC .... B32B 3/12; B32B 3/26; B32B 5/02; B32B 7/14; B32B 27/00; B32B 15/00;
(Continued)

(56) References Cited

U.S. PATENT DOCUMENTS 4,465,725 A   8/1984  Riel
4,647,326 A   3/1987  Pott
(Continued)

FOREIGN PATENT DOCUMENTS

CN   2194263 Y   4/1995
CN   2439977 Y   7/2001
(Continued)

OTHER PUBLICATIONS

Office Action for Chinese Patent Application No. 201510438015.0, dated Oct. 31, 2017, 10 pages including 5 pages of English translation.

*Primary Examiner* — John E Uselding
(74) *Attorney, Agent, or Firm* — Jordan IP Law, LLC; Todd A. Vaughn

(57) ABSTRACT

A honeycomb core construction that includes at least two honeycomb cores and a connection layer that is disposed between the honeycomb cores. The connection layer is configured so as to be gas-permeable, and has an adhesive for adhesively bonding to the honeycomb cores only in a region of the webs of the honeycomb cores.

12 Claims, 1 Drawing Sheet

(51) Int. Cl.
*B32B 7/14* (2006.01)
*B32B 27/00* (2006.01)
*B32B 15/00* (2006.01)
*B32B 7/04* (2019.01)
*B29D 24/00* (2006.01)
*B32B 27/40* (2006.01)
*E04C 2/36* (2006.01)
*B32B 29/00* (2006.01)
*B32B 3/26* (2006.01)
*B32B 29/02* (2006.01)
*B29D 99/00* (2010.01)
*B32B 37/12* (2006.01)
*B32B 7/12* (2006.01)

(52) U.S. Cl.
CPC ................. *B32B 5/02* (2013.01); *B32B 7/04* (2013.01); *B32B 7/12* (2013.01); *B32B 7/14* (2013.01); *B32B 15/00* (2013.01); *B32B 27/00* (2013.01); *B32B 27/40* (2013.01); *B32B 29/00* (2013.01); *B32B 29/02* (2013.01); *B32B 37/12* (2013.01); *B32B 37/1284* (2013.01); *E04C 2/365* (2013.01); *B32B 2250/03* (2013.01); *B32B 2250/05* (2013.01); *B32B 2250/40* (2013.01); *B32B 2255/02* (2013.01); *B32B 2260/021* (2013.01); *B32B 2260/023* (2013.01); *B32B 2260/046* (2013.01); *B32B 2262/02* (2013.01); *B32B 2262/065* (2013.01); *B32B 2262/101* (2013.01); *B32B 2262/105* (2013.01); *B32B 2262/106* (2013.01); *B32B 2307/724* (2013.01); *B32B 2398/10* (2013.01); *B32B 2605/00* (2013.01); *B32B 2605/08* (2013.01); *B32B 2607/00* (2013.01)

(58) Field of Classification Search
CPC ........... B32B 7/04; B32B 27/40; B32B 29/00; B29D 24/005; B29D 99/0089; E04C 2/365
See application file for complete search history.

(56) References Cited

U.S. PATENT DOCUMENTS

| | | | |
|---|---|---|---|
| 6,203,656 | B1 | 3/2001 | Syed |
| 2005/0147790 | A1 | 7/2005 | Levavasseur |

FOREIGN PATENT DOCUMENTS

| | | | |
|---|---|---|---|
| CN | 106182948 | A | 12/2016 |
| CN | 106794658 | A | 5/2017 |
| DE | 102012022713 | B3 | 2/2014 |
| EP | 2746042 | A1 | 6/2014 |
| FR | 2782529 | A1 | 2/2000 |
| JP | S58-114943 | A | 7/1983 |
| JP | S60-120045 | A | 6/1985 |
| JP | S63-172632 | U | 11/1988 |
| JP | H02-078536 | A | 3/1990 |
| JP | H03-093532 | A | 4/1991 |
| JP | H09-254284 | A | 9/1997 |
| KR | 10-2010-0107686 | A | 10/2010 |
| WO | 2015009279 | A1 | 1/2015 |

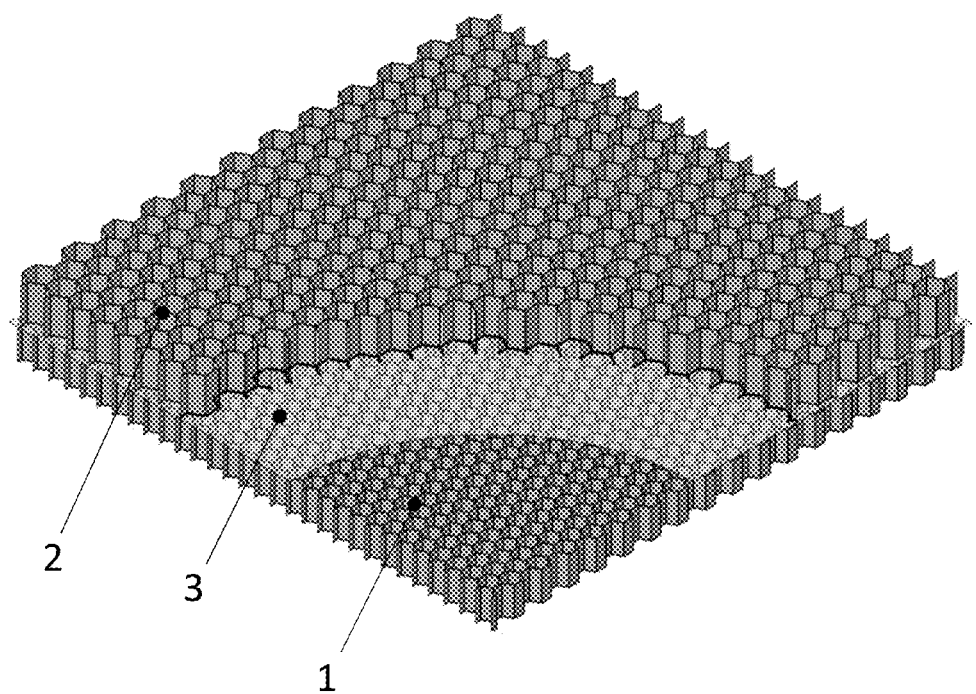

STRUCTURE WITH HONEYCOMB CORE

CROSS-REFERENCE TO RELATED APPLICATIONS

The present application is a National Stage Application of PCT International Application No. PCT/EP2015/080784 (filed on Dec. 21, 2015), under 35 U.S.C. § 371, which claims priority to European Patent Application No. EP 14199858.3 (filed on Dec. 22, 2014), which are each hereby incorporated by reference in their respective entireties.

TECHNICAL FIELD

The present invention relates to a honeycomb core construction comprising at least two honeycomb cores and a connection layer that is disposed between the honeycomb cores. The invention also relates to a method for producing such a honeycomb core construction, and to a method for producing a sandwich component, and to such a sandwich component.

BACKGROUND

Honeycomb cores are usually used as a central layer between two cover layers in a sandwich component which may be employed as a body panel in the automotive industry, for example. Most often, planar sandwich components are generated of which the shape if required may be adapted in a molding press. However, the strength of the honeycomb core is reduced by pressing a honeycomb core ("crush-core method"), and material costs and weight is not saved in the regions of reduced thickness.

In the production of complicated three-dimensional shapes of sandwich components and of respective honeycomb cores, for example of honeycomb cores having jumps in the thickness, it is known for a honeycomb core that corresponds to the desired maximum thickness to be produced, and for the honeycomb core to be cut in the regions of a desired lesser thickness. However, significant cutting waste that cannot be utilized any more is often created herein.

It is also known for two or a plurality of planar ("two-dimensional") honeycomb cores, for example of dissimilar size, to be adhesively bonded to one another, wherein mutual adhesive bonding of the webs is technically barely feasible and, therefore, an intermediate layer having a double-sided application of adhesive, for example an adhesive film or an adhesive paper, is utilized between the honeycomb cores. However, "three-dimensional" honeycomb cores thus constructed may only be further processed to a limited extent since the intermediate layer presents an obstacle to many methods such as downstream shaping in press tools.

SUMMARY

It is an object of the invention to state a honeycomb core construction that can reproduce three-dimensional structures and may also be further processed in a flexible manner, and a method for producing such a honeycomb core construction, and a respective method for producing a sandwich component from such a honeycomb core construction, and a respective sandwich component.

The object is achieved by a honeycomb core construction comprising at least two honeycomb cores and a connection layer that is disposed between the honeycomb cores, wherein the connection layer is configured so as to be gas-permeable and has an adhesive for adhesively bonding to the honeycomb cores only in the region of the webs of the honeycomb cores.

According to the invention, a connection layer is therefore used as an intermediate layer between two honeycomb cores so as to interconnect the latter, however, no planar application of an adhesive to the connection layer is performed, the latter being configured so as to be generally gas-permeable. On account thereof, it is ensured that the two honeycomb cores are interconnected in a gas-permeable, in particular air-permeable, manner, such that a medium such as air that is trapped in the cavities between the webs of the honeycomb cores may diffuse through the connection layer, on account of which an equalization of pressure between the honeycomb cores is also enabled. By way of the application of adhesive that is configured so as to be gas-permeable in the region of the ends of the webs, a honeycomb core according to the invention may be subsequently compressed in a particularly advantageous manner, since the respective internal web ends are reinforced by the reinforcement effect of the adhesive and, on account thereof, those ends of the webs that face an external and optionally later visible surface of the component are more severely compressed and, on account thereof, may prepare a better quality of the visible surface.

Of course, more than two layers of honeycomb cores according to the invention may also be interconnected, wherein gas-permeable connection layers are preferably employed in each case between neighboring honeycomb core layers.

The honeycomb cores are preferably adhesively bonded to the connection layer only at the web ends of the former.

All conceivable geometric shapes having cavities and webs, such as honeycomb-shaped, or undulated, or round, triangular, rectangular, square, trapezoidal, polygonal etc. shapes, may be considered as honeycomb core shapes, wherein the latter herein (within the honeycomb core) do not have to be regularly repeated shapes.

Preferably, at least on one of the honeycomb cores the ends of the webs that face away from the connection layer at least in zones are compressed, and preferably the ends of the webs that face the connection layer in the same zone are compressed to a lesser extent or, in particular, not compressed at all. Herein, "zone" means a portion of the honeycomb core in the longitudinal extent of the latter, that is to say normal to the layered construction of the honeycomb core construction. On account thereof, a sandwich component having a honeycomb core construction of this type may have a high-quality surface in the region of the compressed honeycomb core ends.

It is advantageous that the two honeycomb cores may be configured in a mutually dissimilar manner and therefore may be specified so as to have dissimilar properties. In particular, honeycomb cores having a dissimilar honeycomb shape, honeycomb size, honeycomb alignment, and/or honeycomb material may be stacked and interconnected. This is advantageous above all because, on account thereof, the later completed component may in part be specified so as to have dissimilar functional and component-related properties, respectively. On the one hand, the component is to have a specific required strength and rigidity, and on the other hand, said component at specific locations should include soft and more readily deformable zones, such as is advantageous, for example, in order to avoid injuries in the case of a pedestrian impact.

The connection layer is preferably a fiber-comprising layer, in particular a fibrous material, for example a semi-finished fibrous material, composed of a woven fabric, a scrim, a knitted fabric, mats, and/or a non-woven, wherein the fibers may be natural fibers—for example flax fibers, hemp or bamboo—or glass fibers, carbon fibers, ceramics fibers, textile fibers, or plastics fibers, for example. Reinforcements using paper or nanoparticles are also possible. It would also be possible for the connection layer to be composed entirely of paper or cardboard or of another cellulose-based material. However, to this end it is required that the regions between the webs are left so as to be gas-permeable. The connection layer herein may be composed of one or a plurality of fibrous-material layers or semi-finished fibrous material layers, respectively. The connection layer is preferably reinforced with short or long fibers. In particular, the material may comprise nanoparticles.

The honeycomb cores are preferably paper cores, cardboard cores, or from other materials based on cellulose, but may also be cores from plastics such as PU, PP and similar, or from metal, wool, or foam.

The honeycomb cores may have webs in a honeycomb-shaped arrangement or in an undulated arrangement. However, the webs may also configure round, triangular, rectangular, square, trapezoidal, or polygonal cells.

A method according to the invention for producing a honeycomb core preferably comprises the following steps: providing the two honeycomb cores and the connection layer; applying an adhesive to the web ends of the two honeycomb cores; and joining the honeycomb cores having the connection layer disposed therebetween, that is to say that one honeycomb core is joined to each one of the two sides of the connection layer.

"Joining" may be in particular be performed by laying up, wherein compressing or pressing of the stack is preferably also performed.

Dry fibrous mats in particular may be used herein as a connection layer.

Instead of applying the adhesive to the web ends of the two honeycomb cores, the adhesive may also be applied to the connection layer in the region of the web ends of the two honeycomb cores. This may be performed in particular by using pre-impregnated fibrous material, wherein the regions between the webs are left so as to be gas-permeable, however.

The adhesive layer is preferably applied to the webs and/or to the connection layer, preferably to the webs of both honeycomb cores, by rolling, spraying, brushing, or immersing.

After the honeycomb cores have been joined to the connection layer there is preferably a waiting period so as to enable the component to slightly gel until the adhesive has reached a predefined strength, however particularly preferably not until the adhesive has already completely cured.

Thereafter, the component, specifically the stack formed from the honeycomb cores and connection layer arranged therebetween, on one side or both sides, that is to say on the upper and/or lower side of the stack, is covered, for example sheathed, with dry fibrous material, wherein the fibrous material may have a protrusion beyond the honeycomb cores, or else have no protrusion. The fibrous material is subsequently soaked, sprayed, and/or wetted with a matrix, preferably a PUR matrix. On account thereof, cover layers in particular may be established, and a sandwich component may thus be produced.

Thermoplastic or duroplastic plastics are preferably used as a matrix, or as a matrix material, respectively.

The matrix material, or else another adhesive, may be used as the adhesive for adhesively bonding the connection layer to the honeycomb cores.

Herein, a fibrous material is to be understood to be both a fiber-composite material as well as a semi-finished fibrous material.

A fibrous material herein is to be understood to be, for example, woven fabrics, scrims, knitted fabrics, meshes, mats, and/or non-wovens, wherein the fibers are composed for example of natural fibers, flax fibers, glass fibers, carbon fibers, plastics fibers, ceramic fibers, or textile fibers.

The fibrous material may already include a matrix or not; in particular, the matrix may be a material which is composed of two or more components, such as a resin and a curing agent. Herein, the use of plastics or a plastics resin, respectively, is possible, to which small fibrous tufts have already been mixed, the former as a cover layer being thus applied to the stack from the honeycomb cores and the connection layer.

Instead of being covered or sheathed, respectively, with a dry fibrous material, the paper honeycomb core may also be covered or sheathed, respectively, on the lower and the upper side with a fibrous material (prepreg) that has been pre-impregnated with a matrix, for example a thermoplastic plastic.

The application of a still liquid fiber-matrix material for generating a cover layer would also be possible.

The component may subsequently be press-molded in a preferably heated press-molding tool.

The sandwich component may be molded to the final component shape or three-dimensional contour, respectively, during pressing. Herein, a modification of the shape, or a generation of a contoured component, respectively, as well as a modification of the properties of the cores may be achieved, in particular by partially collapsing the webs.

The configuration of an appealing surface in the visible region of the component is enabled precisely by partially collapsing the webs, in particular only in desired pre-defined regions of the webs, preferably at the web ends in the external region of the later component.

The component may remain in the press-molding tool until the matrix has reached sufficient strength.

Cores that are externally disposed on the component, that is to say cores that are disposed on top and on the bottom of the latter, may preferably be obliquely positioned such that a specific orientation of the webs of the core in relation to the surfaces (external surfaces) is achieved. On account thereof, the quality of the component surface may be further increased.

In particular, such oblique positioning of honeycomb cores may be produced only in specific zones of a later sandwich component, for example in zones having a severely curved component geometry.

To this end, the intermediate layer, in particular the fibrous intermediate layer, may be pre-tensioned, and fibrous material is preferably not only introduced or applied, respectively, between the core layers but also to the cover faces of the component.

Such a sandwich component may be used as a planar component of a motor vehicle, in particular as a front hood, door, roof, rear lid, cargo floor, cover, body floor, or torsion box.

DRAWINGS

The invention will be described in an exemplary manner hereunder with reference to the drawing in which The FIGURE shows a three-dimensional illustration of a honeycomb core construction according to the invention.

DESCRIPTION

A honeycomb core construction according to the invention is illustrated in the FIGURE. The honeycomb core construction comprises two honeycomb cores 1 and 2, and a connection layer 3 which is disposed between the honeycomb cores 1, 2.

The honeycomb cores 1, 2 are paper honeycomb cores in a honeycomb structure, that is to say having hexagonal cells, wherein the two honeycomb cores 1, 2 are configured so as to be mutually dissimilar in that the honeycomb core 1 has a honeycomb size that is different to that of the honeycomb core 2.

The connection layer 3 is used as an intermediate layer for double-sided adhesive bonding, such that the connection layer 3 on one side is adhesively bonded to the honeycomb core 1, and on the second side is adhesively bonded to the honeycomb core 2.

On the connection layer 3, adhesive is only present in the region of the webs of the honeycomb cores 1, 2. There, the ends of the webs of the honeycomb cores 1, 2 are adhesively bonded to the connection layer 3.

The connection layer 3 is, for example, a non-woven, a natural fiber (for example, a flax fiber, hemp, bamboo, etc.), glass fiber, or carbon fiber, and in any case is configured so as to be gas-permeable. On account thereof that adhesive that could prevent the passage of gas is not applied to the connection layer 3 in a planar manner, an exchange of air and thus an equalization of pressure remains possible between the honeycomb cores 1, 2.

LIST OF REFERENCE SIGNS

1 Honeycomb core
2 Honeycomb core
3 Connection layer

What is claimed is:

1. A honeycomb core construction for a of a motor vehicle component, the honeycomb core construction comprising:
   at least two honeycomb cores including a first honeycomb core having first honeycomb webs and a second honeycomb core having second honeycomb webs, wherein the at least two honeycomb cores are dissimilar from each other in terms of orientation such that, in relation to a surface of the component formed by the honeycomb core construction, the first honeycomb webs have a first web orientation that is 90 degrees whereas the second honeycomb webs have a web orientation that is not 90 degrees; and
   a connection layer having a gas-permeable structure that is disposed between the first honeycomb core and the second honeycomb core, the connection layer having an adhesive on both sides thereof to adhesively bond the connection layer to the first honeycomb core and the second honeycomb core only at ends of the first honeycomb webs and the second honeycomb webs.

2. A honeycomb core construction for a motor vehicle component, comprising:
   at least two honeycomb cores including a first honeycomb core having first honeycomb webs and a second honeycomb core having second honeycomb webs, wherein the at least two honeycomb cores are dissimilar from each other in terms of orientation such that, in relation to a surface of the component formed by the honeycomb core construction, the first honeycomb webs have a first web orientation that is 90 degrees whereas the second honeycomb webs have a web orientation that is not 90 degrees; and
   an intermediate connection layer arranged between the first honeycomb core and the second honeycomb core, the intermediate connection layer having a gas-permeable structure to facilitate an exchange of air and an equalization of pressure between the first honeycomb core and the second honeycomb core, and also an adhesive on both sides thereof to adhesively bond the intermediate connection layer to the first honeycomb core and the second honeycomb core only at ends of the first honeycomb webs and the second honeycomb webs.

3. A honeycomb core construction for a motor vehicle body, comprising:
   a first honeycomb core having first honeycomb webs;
   a second honeycomb core having second honeycomb webs, wherein the second honeycomb core is dissimilar from the first honeycomb core in terms of orientation such that, in relation to a surface of the component formed by the honeycomb core construction, the first honeycomb webs have a first web orientation that is 90 degrees whereas the second honeycomb webs have a web orientation that is not 90 degrees; and
   an intermediate, gas-permeable connection layer arranged between the first honeycomb core and the second honeycomb core to facilitate an exchange of air and an equalization of pressure between the first honeycomb core and the second honeycomb core, the intermediate, gas-permeable connection layer having an adhesive on both sides thereof to adhesively bond the intermediate, gas-permeable connection layer on a first side to web ends of the first honeycomb core and on a second side to web ends of the second honeycomb core.

4. The honeycomb core construction for a motor vehicle component of claim 1, wherein the at least two honeycomb cores are dissimilar from each other such that, in certain zones of the honeycomb core construction, the ends of the first honeycomb webs that face away from the connection layer, are compressed, whereas the ends of the second honeycomb webs that face the connection layer, are not compressed.

5. The honeycomb core construction for a motor vehicle component of claim 2, wherein the at least two honeycomb cores are dissimilar from each other such that, in certain zones of the honeycomb core construction, the ends of the first honeycomb webs that face away from the connection layer, are compressed, whereas the ends of the second honeycomb webs that face the connection layer, are not compressed.

6. The honeycomb core construction for a motor vehicle body of claim 3, wherein the second honeycomb core is dissimilar from the first honeycomb core such that, in certain zones of the honeycomb core construction, the ends of the first honeycomb webs that face away from the connection layer, are compressed, whereas the ends of the second honeycomb webs that face the connection layer, are not compressed.

7. The honeycomb core construction for a motor vehicle component of claim 1, wherein the connection layer comprises a fiber material.

8. The honeycomb core construction for a motor vehicle component of claim 2, wherein the connection layer comprises a fiber material.

9. The honeycomb core construction for a motor vehicle body of claim 3, wherein the connection layer comprises a fiber material.

10. The honeycomb core construction for a motor vehicle component of claim 1, wherein the at least two honeycomb cores comprises paper cores, or cores from plastics, metal, wood, or foam.

11. The honeycomb core construction for a motor vehicle component of claim 2, wherein the at least two honeycomb cores comprises paper cores, or cores from plastics, metal, wood, or foam.

12. The honeycomb core construction for a motor vehicle body of claim 3, wherein the at least two honeycomb cores comprises paper cores, or cores from plastics, metal, wood, or foam.

* * * * *